United States Patent

[11] 3,567,945

| [72] | Inventor | Vernon L. Appleby |
| | | Littleton, Colo. |
| [21] | Appl. No. | 786,261 |
| [22] | Filed | Dec. 23, 1968 |
| [45] | Patented | Mar. 2, 1971 |
| [73] | Assignee | Honeywell Inc., |
| | | Minneapolis, Minn. |

[54] PHOTOELECTRIC ROTATIONAL DIRECTION SENSOR
8 Claims, 3 Drawing Figs.

[52] U.S. Cl. .................................................. 250/209,
250/208, 250/233
[51] Int. Cl. .................................................. G01d 5/30,
G01d 5/247, H03k 5/01
[50] Field of Search........................................... 250/208,
209, 233; 307/311

[56] References Cited
UNITED STATES PATENTS

| 2,685,082 | 7/1954 | Beman et al. | 250/233X |
| 2,949,672 | 8/1960 | Ostergren | 250/233X |
| 3,040,215 | 6/1962 | Farmer et al. | 250/233X |
| 3,056,033 | 9/1962 | Shepard | 250/233X |
| 3,235,742 | 2/1966 | Peters | 250/233X |

*Primary Examiner*—Roy Lake
*Assistant Examiner*—C. R. Campbell
*Attorneys*—Arthur H. Swanson and D. Burton Lockwood

ABSTRACT: There is provided a system including a light source, which, in accordance with the operation of a rotating device, produces pulses of light which are applied to a logic circuit. The circuit is capable of detecting the relative phase relationship between the light pulses and producing an output signal which is indicative of the direction of rotation of the rotating device.

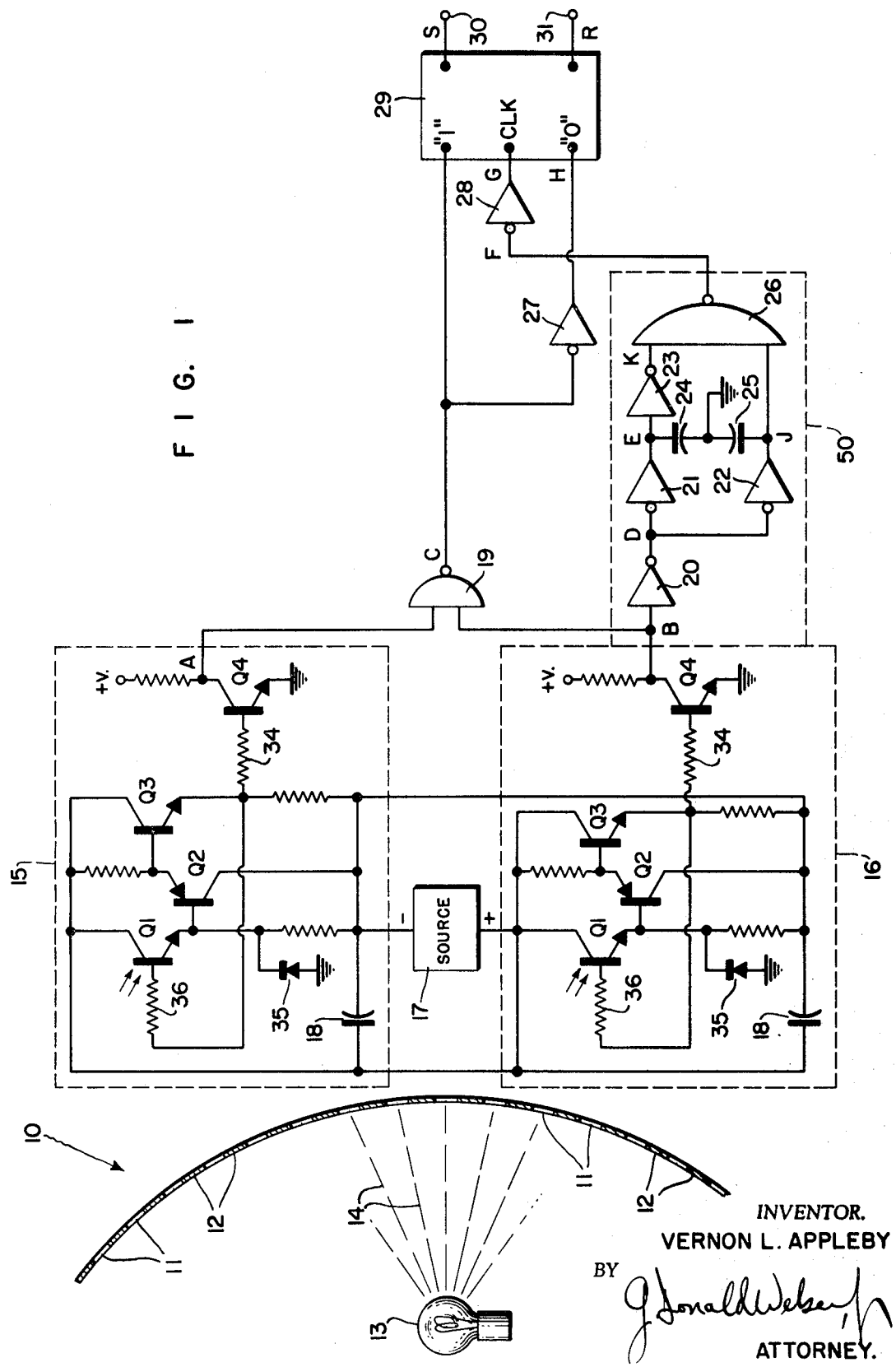

INVENTOR.
VERNON L. APPLEBY

PHOTOELECTRIC ROTATIONAL DIRECTION SENSOR

In many tape transport devices the tape reels, supply or takeup, are driven in a reversible manner. Thus, the reels can rotate in the clockwise direction or in the counterclockwise direction. Inasmuch as the reels (and the driving means associated therewith) are frequently driven at high speeds, a large inertia may be induced. Consequently, with the application of a signal to reverse the direction of rotation of the apparatus, an actual reversal of direction may not be effected in the time allotted or permitted therefor. The signals used to produce the reversal in the rotational direction frequently control the operation of other components. Thus, it is not unusual for vacuum loop boxes and other similar devices or operational functions to be controlled by the same signals. Consequently, it may occur that the logic system produces direction reversal signals which produce appropriate electrical control functions. However, these signals and control functions may change so rapidly that the mechanical devices operate improperly or not at all. Thus, it is possible that the vacuum loop box, the driving of the tape or the like, may be improperly affected and the entire tape transport system be rendered inoperative or caused to malfunction.

Consequently, the instant invention has been developed. There is provided a circuit which detects, the direction of rotation of a device and produces signals which are indicative thereof. The circuit includes means for detecting pulses of light produced by the rotating device and determining the phase relation of the light pulses. The phase relation of the light pulses is detected by logic circuitry which produces the aforesaid signals. These signals can be utilized to drive indicating devices such as lights or the like, which indicate the reel direction. Moreover, these signals may be applied to other logic circuits to provide a control function wherein mechanical operation must be completed prior to electrical or logic functions being changed.

Thus, one object of this invention is to provide a photoelectric rotational direction sensor.

Another object of this invention is to provide a photoelectric rotational direction sensor which can be used with a tape transport or similar apparatus.

Another object of this invention is to provide a photoelectric rotational direction sensor which has relatively few components to provide a logic control function.

Another object of this invention is to provide a photoelectric rotational direction sensor wherein a light source provides control signals to control logic circuit operation.

These and other objects and advantages of the instant invention may become more readily apparent when the following description is read in conjunction with the attached drawing, in which:

FIG. 1 is a partially schematic, partially block diagram of a control circuit including a light source;

Figure 3:
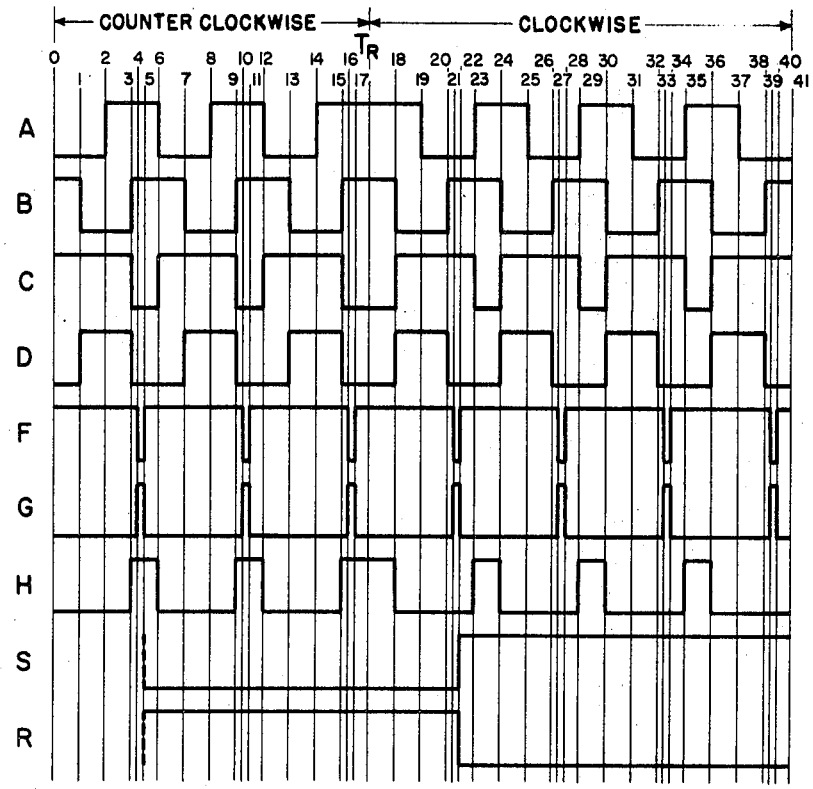
FIG. 3 is a timing diagram of the signals found throughout the circuit shown in FIG. 1.

Referring now to FIG. 1, there is shown a schematic representation of a slotted wheel or the like which may be associated with a rotating device. The disc or wheel 10 has a plurality of slots 11 in the periphery thereof. A plurality of bars or ribs 12 extended across the light path wherein light from light source 13 passes through slots 11 between ribs 12. Light from source 13, indicated by radial lines 14, passes through slots 11 and impinges upon phototransistors Q1 of the photodetector and amplifier circuits 15 and 16. Circuits 15 and 16 are substantially identical and a description of either one applies as well to the other. Phototransistor Q1 has the collector thereof connected to a source of positive potential, for example +15 volts DC which is supplied by source 17. Obviously, suitable filters or the like may be included in source 17. The emitter electrode of transistor Q1 is connected via a suitable resistor to the negative side of source 17 which may be on the order of —15 volts DC. The emitter of transistor Q1 is further connected to ground via clamping diode 35 which is arranged to limit the negative excursion of the emitter of transistor Q1. Diode 35 protects transistor Q1 and, as well limits saturation thereof. A capacitor 18 is connected between the positive and negative sources to provide a noise suppressing isolation filter. The emitter of transistor Q1 is further connected to the base of PNP transistor Q2. The collector of transistor Q2 is connected to the negative source while the emitter of transistor Q2 is connected to the positive source via a suitable biasing resistor.

The emitter of transistor Q2 is further connected to the base of NPN transistor Q3. The collector of transistor Q3 is connected to the positive source terminal while the emitter of transistor Q3 is connected via a suitable biasing resistor, to the negative source terminal. In addition, the emitter of transistor Q3 is connected to the base of transistor Q1 via resistor 36 to effect suitable positive feedback. In addition, the emitter of transistor Q3 is connected to the base of NPN transistor Q4 via isolating resistor 34. The emitter of transistor Q4 is connected to ground or other suitable reference source while the collector is connected to a source of positive voltage (for example +5 volts) via a suitable biasing resistor.

The individual collector electrodes of transistors Q4 of circuits 15 and 16 are connected to separate input terminals of NAND gate 19. The output of gate 19 is connected to the 1 side of flip-flop 29. In addition, the output of gate 19 is connected to the 0 side of flip-flop 29 via inverter 27.

The collector of transistor Q4 of detector and amplifier circuit 16 is further connected to the input of a delayed one shot circuit 50. More particularly, the collector of transistor Q4 is connected to the input of inverter 20. The output of inverter 20 is connected to the inputs of the inventers 21 and 22. The output of inverter 22 is connected directly to one input of NAND gate 26. The output of inverter 21 is connected to another input of NAND gate 26 via a further inverter 23. In addition, the outputs of inverters 21 and 22 are connected to ground via capacitors 24 and 25, respectively. Capacitor 24 exhibits a larger capacitance than capacitor 25 thereby providing a circuit having a larger RC time constant, as will appear hereinafter. The output of NAND gate 26 is connected via inverter 28 to the clock (CLK) input of flip-flop 29 to effect a toggle input thereof. The output terminals 30 and 31 are connected to the respective output sides of the flip-flop 29.

In operation, as wheel 10 rotates, light passes through slots 11 therein and impinges upon the transistors Q1 in circuits 15 or 16, respectively. Impingement of light upon transistor Q1 causes conduction thereby. Conduction by transistor Q1 produces a more positive potential at the base of the transistor Q2 thus tending to turn off the latter transistor. This operation of transistor Q2 tends to produce higher potential at the base of transistor Q3 which becomes more conductive as a result. When transistor Q3 is more conductive, a higher potential is applied at the base of transistor Q4 and causes higher conduction thereby. As transistor Q4 conducts more heavily, the potential at the emitter thereof (signal A becomes a relatively low level signal and is applied to one input of NAND gate 19.

Thus, the photodetector and amplifier circuits 15 and 16 convert light energy from light source 13 to low level amplifier signals. Conversely, when light source 13 is blocked by ribs 12 in wheel 10, the detector and amplifier circuits 15 and 16 produce high level output signals. Photodetector amplifiers 15 and 16 are spaced, in conjunction with the ribs and slots of wheel 10, to produce electrical signals which are 90° out-of-phase electrically. In a typical embodiment, this construction of the code wheel causes signal B (circuit 16) to lead signal A (circuit 15) when the code wheel 10 is rotated in a clockwise direction. Conversely, when wheel 10 is rotated counterclockwise, signal A will lead signal B.

Figure 2:
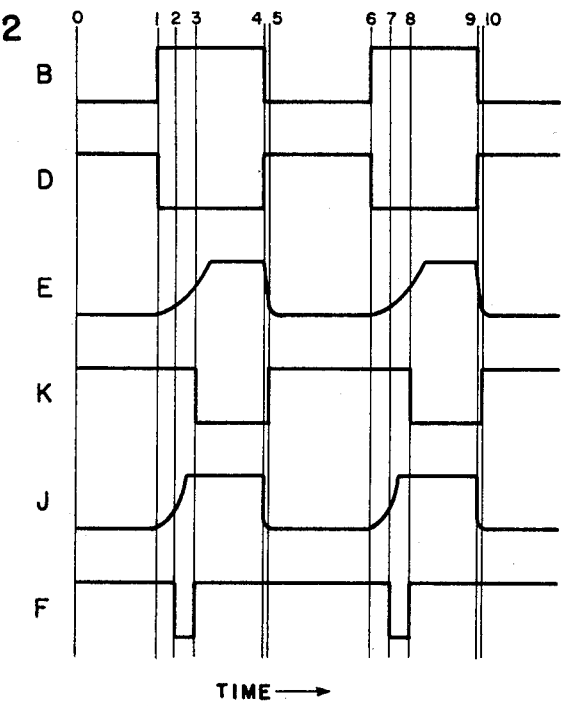
FIG. 2 is a timing diagram for the delayed one shot circuit shown in FIG. 1.

Referring now to FIGS. 2 and 1 concurrently, the operation of one shot circuit 50 is described. The signal B supplied by transistor Q4 of circuit 16 is shown switching from the low level to the high level at time T1. The output signal D of inverter 20 is opposite to signal B and, consequently, switches from the high to the low level at time period T1. This signal is supplied to the inputs of inverters 21 and 22 and would normally produce opposite signals which would be substantially similar to signals B. However, the capacitors 24 and 25 are connected to the outputs of inverters 21 and 22, respectively. As noted, capacitor 24 has a larger capacitance value and, consequently, has a larger time constant. Thus, while capacitor 25 charges relatively rapidly so that the signal at the output of inverter 22 follows waveform J, capacitor 24 charges relatively slowly and output signal E follows that waveform. Signal J is applied to an input of NAND gate 26. At time T2, signal J achieves a level which causes the output thereof to switch to the negative level. Conversely, at time period T3, signal E reaches the switching level and effects a signal change, via inverter 23, to produce signal K. Thus, at time period T3 a low level signal K is supplied to an input of NAND gate 26 thereby producing a positive output signal F at the output terminal thereof.

At time period T4, signal B switches to the low level, as light impinges upon transistor Q1 of circuit 16 by passing through a slot 11 in wheel 10. Signal D immediately follows in inverse direction, the signal B. Signals E and J are not delayed inasmuch as the capacitors 24 and 25 are discharged through low resistance saturated transistors (not shown) at the outputs of inverters 21 and 22. Between time periods T4 and T5 (a very short time duration), signal J reaches the low level. But inasmuch as signal K is already a low level signal, the output signal produced by gate 26 does not change. Moreover, when signal E reaches the triggerable level and signal K achieves the positive level, the low level signal J continues to cause gate 26 to produce a high level output signal F.

At time period T6, the B signal switches from the low to the high level and the circuit operation repeats the operation described relative to time period T1. The operation at time periods T7, T8 and T9 is the same as shown and described as time periods T2, T3 and T4.

Thus, the signal produced by the switching of the photodetector circuit, especially the signal at the output of circuit 16, is delayed somewhat in order to assure that this signal does not occur during an unstable or switching portion of the cycle. Moreover, signal F, the signal representative of the change of state of circuit 16, is a relatively narrow signal of substantially uniform duration in order to provide better synchronization and operation of the overall circuit.

Referring now to FIGS. 1 and 3 concurrently, a timing diagram for the entire circuit is shown. The signals A and B are signals produced by photodetector and amplifier circuits 15 and 16, as a function of the application of light to the transistors Q1 through the slots 11 and wheel 10 from source 13. Clearly, as noted, signals A and B are 90° out-of-phase. Signal C is produced at the output of NAND gate 19 and is a high level signal except when the signals A and B are, concurrently, high level signals. Such a condition exists between time periods T3 and T6 wherein signals A and B are high level signals and signal C is a low level signal. That is, in counterclockwise rotation, the leading portion of signal B overlaps the trailing portion of signal A. Signal D is, the inverse of B due to the operation of inverter 20. Signal F is the output signal produced by gate 26 in accordance with the circuit operation as described relative to the timing diagram shown in FIG. 2. Signal F is delayed relative to the trailing edge of signal D which occurs at time period T3. Signals F and G occur at time period T4 and terminal at time period T5. Thus, the entire pulse of signals F and G occur during the occurrence of signal C which is applied to the 1 input of flip-flop 29. Signal G is, of course, the inverse of signal F due to the operation of inverter 28. Inverter 28 is required inasmuch as flip-flop 29 is designed to trigger on the trailing edge of a positive going signal. Thus, inverter 28 provides the sole purpose of supplying a signal of a proper polarity to the clock (CLK) of flip-flop 29.

The H signal is identical to the C signal except in respect of polarity. That is, inverter 27 inverts the signal C and produces the H signal at the 0 input of flip-flop 29. It will be seen that the 1 input of flip-flop 29 receives a negative signal and the 0 input of flip-flop 29 receives a positive signal during the application of clock pulse G. Thus, the output signals at terminal 30 and 31 are the signals S and R, respectively, which are transferred from the 1 and 0 inputs, respectively.

Similar operation occurs during time period T8 through T12, and during time periods T14 through T17. It is noted that during these times the A and B signals are uniform in duration indicating a relatively constant rotation rate in one direction of wheel 10 relative to source 13. Of course, a constant rate is not required for proper operation.

At time period $T_R$ (the reversal time) a signal is produced by external controls which causes the rotational device to change from the counterclockwise, to the clockwise rotation. This change in direction is represented by a relatively abrupt change which, is possible, in many servo systems. Thus, signal A remains at the positive level between time periods T14 through T19. Thus, it is represented that the wheel 10 is in such a position that a bar 12 is, effectively, maintained intermediate light source 13 and transistor Q1 of circuit 16 during the reversal period. When the rotational device actually begins to rotate in the clockwise direction (opposite to the preceeding direction) it is seen that signal B now leads signal A by a 90° phase angle. Once again, signal D produces the inverse signal level of B due to the operation of inverter 20. In addition, signal C, as produced by gate 19, is a low level signal only when signals A and B are mutually high level signals. Because of the change in lead-lag relationship, signal C now occurs during the trailing portion of signal B and the leading portion of signal A rather than the reverse situation as occurred during the original rotational direction of the rotating device. Inasmuch as signal F is produced as a function of the operation of signal D, this control signal (along with its inverse signal G) continues to occur shortly after the termination of signal D. Inasmuch as signal C occurs during the trailing portion of signal B and signal G occurs during the leading portion of signal B, there is no coincidence of these signals. Consequently, when the clock signal G is applied to the CLK input terminal of flip-flop 29 at time periods T27, T32 and T38, a high level signal is applied at the 1 input terminal of flip-flop 29 and a low level signal H is applied to the 0 input terminal of flip-flop 29. Consequently, the application of clock signal G at time period T21 produces high and low level signals at output terminals 30 and 31, respectively.

Thus, it is seen that with the reversal of the rotational direction of the rotational device, the lead-lag relationship between signals A and B have been altered by 180°. That is, in one case signal A leads by 90°. Inasmuch as clock signal G is, ultimately, controlled by signal B, there is no change in the phase relationship thereof. Moreover, since signals C and H are, directly related to the phase relationship between signals A and B, are relationship between signals G and C will vary as the reversal occurs. As this phase or difference occurs, the clocking of flip-flop 29 occurs during the different portions of signals C and H. Thus, the output signals S and R detected at output terminals 30 and 31 will change polarities.

Suitable output devices can be controlled by the output signals produced by flip-flop 29. This output or utilization equipment includes lights or other alarms which indicate the direction of rotation of the rotational device. In addition, other logic circuitry can be connected thereto such that a direction reversal by the rotational device will cause appropriate action of other control circuitry.

There has been described a preferred embodiment of the invention. It is to be understood that modifications in the device may be made without departing from the inventive concept presented herein. For example, wheel 10 may have a relatively large or a relatively small number of slots. Moreover, wheel 10 may be replaced by any suitable optical or electrical system for generating signals indicative of the relationship so long as a phase relationship completing the signals is provided. In addition, the photodetector and amplifier circuits shown may be modified in many ways without departing from the inventive concept of the instant invention.

I claim:

1. A photoelectric rotational direction sensor comprising, energy source means, detector means responsive to energy produced by said energy source means to produce signals indicative of receipt of energy from said energy source means, gate means connected to said detector means for producing signals as a function of the signals produced by said detector means, switch means connected to said detector means to receive signals therefrom, and waveshaping means connected between said detector means and said switch means to supply a signal to said switch means to control the operation thereof, said waveshaping means including first and second inverter means having the inputs thereof connected to said detector means, third inverter means connected to the output of energy storage means, said energy storage means comprising a first and a second energy storing means, said first and said second energy storing means connected to the outputs of said first and second inverter means respectively, said first and said second energy storing means having different values thereby exhibiting different time constants whereby the rate of energy storing is different, and further gate means having the inputs thereof connected to the outputs of said second and third inverter means and operative to produce an output signal in response to coincident signals supplied to the inputs thereof.

2. The combination recited in claim 1, wherein said energy source means comprises a light source, and said detector means comprises a photodetector and amplifier circuit.

3. The combination recited in claim 2 wherein said photodetector and amplifier circuit includes a phototransistor, said light source selectively illuminates said phototransistor to alter the operating condition thereof whereby the signal produced by said detector means is selectively varied.

4. The combination recited in claim 1 including means for selectively interrupting the transfer of energy from said energy source means to said detector means.

5. The combination recited in claim 4 wherein said means for selectively interrupting includes apertured means having at least one aperture therein, said apertured means disposed between said energy source means and said detector means, driving means for causing relative motion between said apertured means and said energy source means such that energy is transferred from said energy source means to said detector means only when an aperture is disposed therebetween.

6. The combination recited in claim 5 wherein said detector means includes at least two separate detecting units which are located relative to each other and said apertured means so as to produce electrical signals which are 90° out-of-phase, the lead-lag relationship of the out-of-phase electrical signals being determined by the direction of motion of said apertured means.

7. The combination recited in claim 6 wherein said gate means receives signals from each of said detecting units and produces an output signal only during coincidence of signals from each of said units, said switch means comprises flip-flop means, said gate means connected directly to one input of said flip-flop means, and inverter means connected between said gate means and another input of said flip-flop means.

8. The combination recited in claim 7 wherein said waveshaping means includes a delayed single pulse circuit, said single pulse circuit supplying an output signal to a control input of said flip-flop means to selectively produce output signals from said flip-flop means in accordance with the input signals supplied thereto.